United States Patent
Safe et al.

(10) Patent No.: US 10,990,734 B1
(45) Date of Patent: Apr. 27, 2021

(54) PARTITION-BASED CIRCUIT ANALYSIS AND VERIFICATION

(71) Applicant: Cadence Design Systems, Inc., San Jose, CA (US)

(72) Inventors: Georgia Penido Safe, Belo Horizonte (BR); Vincent Gregory Reynolds, Maidenhead (GB); Adriana Cassia Rossi de Almeida Braz, Brasilia (BR); Julio Alexandre Silva Rezende, Belo Horizonte (BR)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/716,153

(22) Filed: Dec. 16, 2019

(51) Int. Cl.
*G06F 30/3323* (2020.01)
*G06F 119/12* (2020.01)

(52) U.S. Cl.
CPC ...... *G06F 30/3323* (2020.01); *G06F 2119/12* (2020.01)

(58) Field of Classification Search
CPC .. G06F 30/3323; G06F 2119/12; G06F 30/33; G06F 30/327; G06F 11/362; G06F 30/20; G06F 30/30; G06F 30/367
See application file for complete search history.

(56) References Cited

U.S. PATENT DOCUMENTS 6,915,248 B1 * 7/2005 Ip ............................ G06F 30/33
703/14
7,028,279 B2 * 4/2006 Jain ..................... G06F 30/3323
716/106
7,325,209 B2 * 1/2008 Mitra .................. G06F 30/3323
716/102

(Continued)

FOREIGN PATENT DOCUMENTS

JP        2004213619 A  *  7/2004  .......... G06F 30/3323

OTHER PUBLICATIONS

Hernandez et al.; "Transformations on the FSMD of the RTL code with combinational logic statements for equivalence checking of HLS"; 2015 16th Latin-American Test Symposium (LATS); Conference Paper; Publisher: IEEE (Year: 2015).*

(Continued)

*Primary Examiner* — Helen Rossoshek
(74) *Attorney, Agent, or Firm* — Schwegman Lundberg & Woessner, P.A.

(57) ABSTRACT

Devices, methods, computer readable media, and other embodiments are described for automated formal analysis and verification of a circuit design. One embodiment involves accessing a circuit design and a set of default verification targets for the circuit design. A plurality of partitions for the circuit design are then automatically generated, and a first partition is analyzed to generate a first set of verification targets for the first partition based on the set of default verification targets and a set of partition and schedule values for the first partition. A first formal verification analysis is performed on the first partition, the first set of verification targets, and the set of partition and schedule values, and a formal verification output is generated based on the first formal verification analysis. Various embodiments can additionally involve stagnation analysis and additional automation to customize the analysis for each partition.

20 Claims, 9 Drawing Sheets

(56) References Cited

U.S. PATENT DOCUMENTS

| | | | | |
|---|---|---|---|---|
| 7,483,823 B2* | 1/2009 | Alfieri | G06F 30/30 | 703/14 |
| 7,694,253 B2* | 4/2010 | Campos | G06F 30/20 | 716/106 |
| 7,853,903 B1* | 12/2010 | Goldberg | G06F 30/3323 | 716/106 |
| 8,060,847 B2* | 11/2011 | Seawright | G06F 30/3323 | 716/106 |
| 8,326,592 B2* | 12/2012 | McMillan | G06F 30/33 | 703/14 |
| 8,413,088 B1* | 4/2013 | Armbruster | G06F 30/33 | 716/106 |
| 8,418,101 B1* | 4/2013 | Kuehlmann | G06F 30/3312 | 716/107 |
| 8,554,530 B1* | 10/2013 | O'Riordan | G06F 30/33 | 703/14 |
| 8,910,099 B1* | 12/2014 | Goyal | G06F 30/3323 | 716/112 |
| 8,997,030 B1* | 3/2015 | Kailas | G06F 30/3323 | 716/107 |
| 9,047,427 B1* | 6/2015 | Doucet | G06F 30/398 | |
| 9,280,496 B2* | 3/2016 | Auerbach | G06F 13/14 | |
| 9,633,153 B1* | 4/2017 | Khaikin | G06F 30/33 | |
| 9,817,929 B1* | 11/2017 | Chauhan | G06F 30/3323 | |
| 9,817,930 B1* | 11/2017 | Campos | G06F 30/18 | |
| 9,858,372 B1* | 1/2018 | Oliveira | G06F 30/30 | |
| 9,922,209 B1* | 3/2018 | Purri | G06F 30/3323 | |
| 10,162,917 B1* | 12/2018 | Peixoto | G06F 30/3323 | |
| 10,210,296 B2* | 2/2019 | Baumgartner | G06F 30/3323 | |
| 10,380,295 B1* | 8/2019 | Ip | G06F 30/30 | |
| 10,380,301 B1* | 8/2019 | Goyal | G06F 30/30 | |
| 10,503,853 B1* | 12/2019 | Saha | G06F 30/3323 | |
| 10,782,767 B1* | 9/2020 | Elkader | G06F 30/33 | |
| 2017/0169149 A1* | 6/2017 | Kailas | G06F 30/367 | |
| 2018/0276318 A1* | 9/2018 | Baumgartner | G06F 30/3323 | |

OTHER PUBLICATIONS

Hamon et al.; "Generating Efficient Test Sets with a Model Checker"; Proceedings of the Second International Conference on Software Engineering and Formal Methods, 2004. SEFM 2004; Conference Paper; Publisher: IEEE (Year: 2004).*

* cited by examiner

PARTITION-BASED CIRCUIT ANALYSIS AND VERIFICATION

TECHNICAL FIELD

Embodiments described herein relate to electronic design automation (EDA) and to systems, methods, devices, and instructions for automatic deep-state formal circuit analysis and formal analysis tools for use with design and creation of circuits and circuit designs.

BACKGROUND

Electronic design automation (EDA) is a category of systems for assisting with the design of electronic systems and devices. Large, integrated circuit designs include significant complexity and can be assembled from previously designed blocks so that each detail of the design and potential problems with the design are not clear to a designer. The use of EDA tools enables reduced turnaround times for generation of an integrated circuit. Schematic and layout information for such block portions of a design may be exchanged or licensed as intellectual property, and processes for verification of designs using such blocks can be part of EDA tools.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
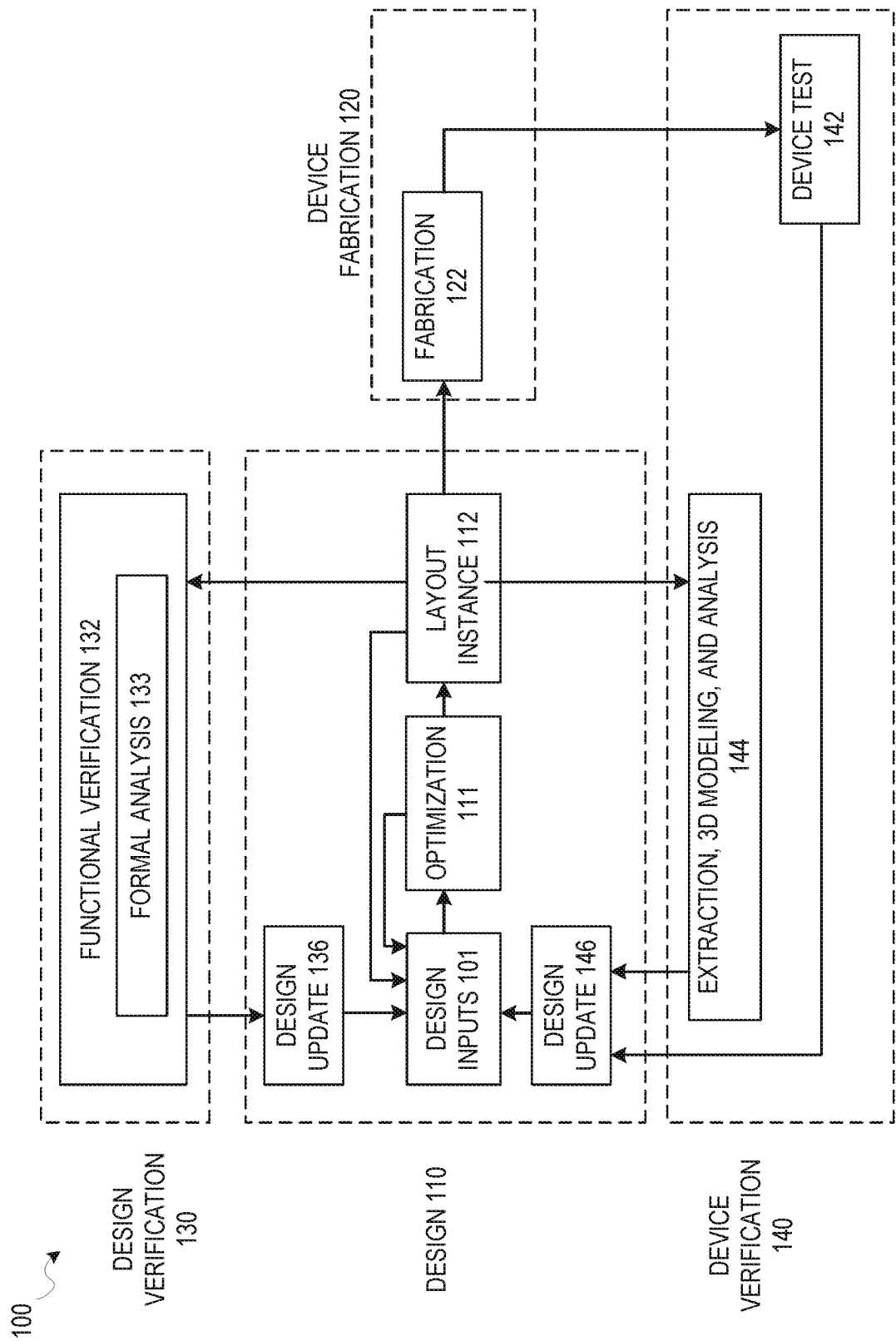
FIG. 1 is a diagram illustrating aspects of one possible design process flow for generating a circuit design and associated circuits, which can use automatic deep-state formal analysis, in accordance with some embodiments.

Embodiments described herein relate to EDA and to methods, computer media, and devices for automatic deep-state formal circuit analysis and formal analysis tools for use with design and creation of circuits and circuit designs.

Formal verification refers to operations to prove or disprove the correctness of aspects of a system. Traditional formal analysis and formal verification of a circuit design involves using formal methods of mathematics to prove or disprove contentions associated with the performance criteria of a design and can include model checking for exhaustive exploration of a mathematical model of a design. As the number of elements of a circuit design and the associated complexity of a design increase, such exhaustive formal analysis and verification of a design becomes resource intensive, if it is possible at all due to difficulties of verifying certain types of designs. In order to identify bugs in a complex system, non-exhaustive analysis using the tools of formal verification can be used. Such non-exhaustive operations are also referred to herein as formal analysis and formal verification, even though they do not perform traditional exhaustive proofs. Such tools, however, can involve configurations that result in ineffective verification operations. Additionally, some such tools can easily enter infinite loops of attempting to formally prove an unprovable contention within the context of a particular circuit design or can be configured in ways that degrade results of formal verification operations.

Embodiments described herein include automation of formal analysis operations in complex circuit designs with "deep-state" properties that are not always transparently accessible to a designer due to the complexity of a design. Various embodiments include default configuration values for particular different non-exhaustive formal analysis tools. Particular circuit designs can then have properties analyzed to automatically assist with generation, cleanup, and selection of analysis covers. This can include automatic creation of a suitable number of diverse helper cover properties in a cone of influence of target properties being analyzed as part of formal verification operations. This can also include cleanup of problematic helper cover properties, such as filtering out unreachable covers and confirming that a final set of covers contains a balance of undetermined and determined covers to provide a resulting analysis of deep-states within a complex design. Embodiments also include operations to maintain the effectiveness of the formal analysis, such as partitioning, monitoring, and regrouping, which prevents the unnecessary use of processing resources. This can involve, in various embodiments, stagnation detection and triggers to restart an analysis under certain situations. This can be configured by setting a maximum time interval allowed without new results and can involve partitioning targets to boost analysis of certain aspects of a design.

Such embodiments improve the operation of a device performing EDA operations by reducing the processing resources for certain formal analysis operations during a circuit design process. This can also improve the operation of a device by reducing the time for a given set of processing resources to complete formal analysis of a circuit design. Additional details of embodiments to achieve such benefits are described below.

FIG. 1 is a diagram illustrating one possible design process flow which can include formal analysis, in accordance with embodiments described herein. FIG. 1 illustrates one design flow 100, but other design flows are possible with the embodiments described herein and design flow 100 is particularly described here as an example for the purposes of illustration. As illustrated, the overall design flow 100 includes a design phase 110, a device fabrication phase 120, a design verification phase 130, and a device verification phase 140. Design verification includes functional verification 132, which further includes formal analysis 133. Specific details of formal analysis 133 in accordance with embodiments described herein, are discussed with respect to figures below, but can be integrated with other formal analysis operations, other functional verification 132 operations, or any such procedures as part of the generation of a circuit design.

As part of such a circuit design process flow, the design phase 110 involves an initial design input operation 101 where the basic elements and functionality of a device are determined, as well as revisions based on various analyses and optimization of a circuit design. This design input operation 101 is where initial layouts for a circuit are generated before adjustments are made to ensure that functional requirements of the circuit are met. The initial strategy, tactics, and context for the device to be created are also generated in the design input operation 101, depending on the particular design algorithm to be used.

In some embodiments, following an initial selection of design values in the design input operation 101, updates to an initial circuit design may be generated, in accordance with various embodiments described herein, during an optimization operation 111 or a layout instance 112, along with any other automated design processes. As described below, design constraints for a circuit design may be initiated with design inputs in the design input operation 101 and then may be analyzed using a timing analysis, according to various embodiments. While the design flow 100 shows optimization occurring prior to the layout instance 112, updates to a circuit design may be performed at any time to improve expected operation of a circuit design, including optimizations to correct errors identified during formal analysis 133. In some EDA design systems, design updates 136 can be initiated or performed automatically based on system information about errors identified during formal analysis 133 based on information in an EDA system about correcting the type of error(s) identified during such formal analysis 133.

After design inputs (e.g., functional descriptions of a circuit) are used in the design input operation 101 to generate a circuit layout, and any optimization operations 111 are performed, a layout is generated in the layout instance 112. The layout describes the physical layout dimensions of the device that match the design inputs. This layout may then be used in the device fabrication operation 122 to generate a device, or additional testing and design updates may be performed using designer inputs or automated updates based on design simulation and other operations for functional verification 132. This can include not only formal analysis 133, but other operations for functional verification 132. Additional analysis can be part of extraction, three-dimensional (3D) modeling, and analysis 144 operations. Once the device is generated, the device can be tested as part of device test 142 operations and layout modifications generated for design update 146 if needed based on actual device performance.

Figure 2:
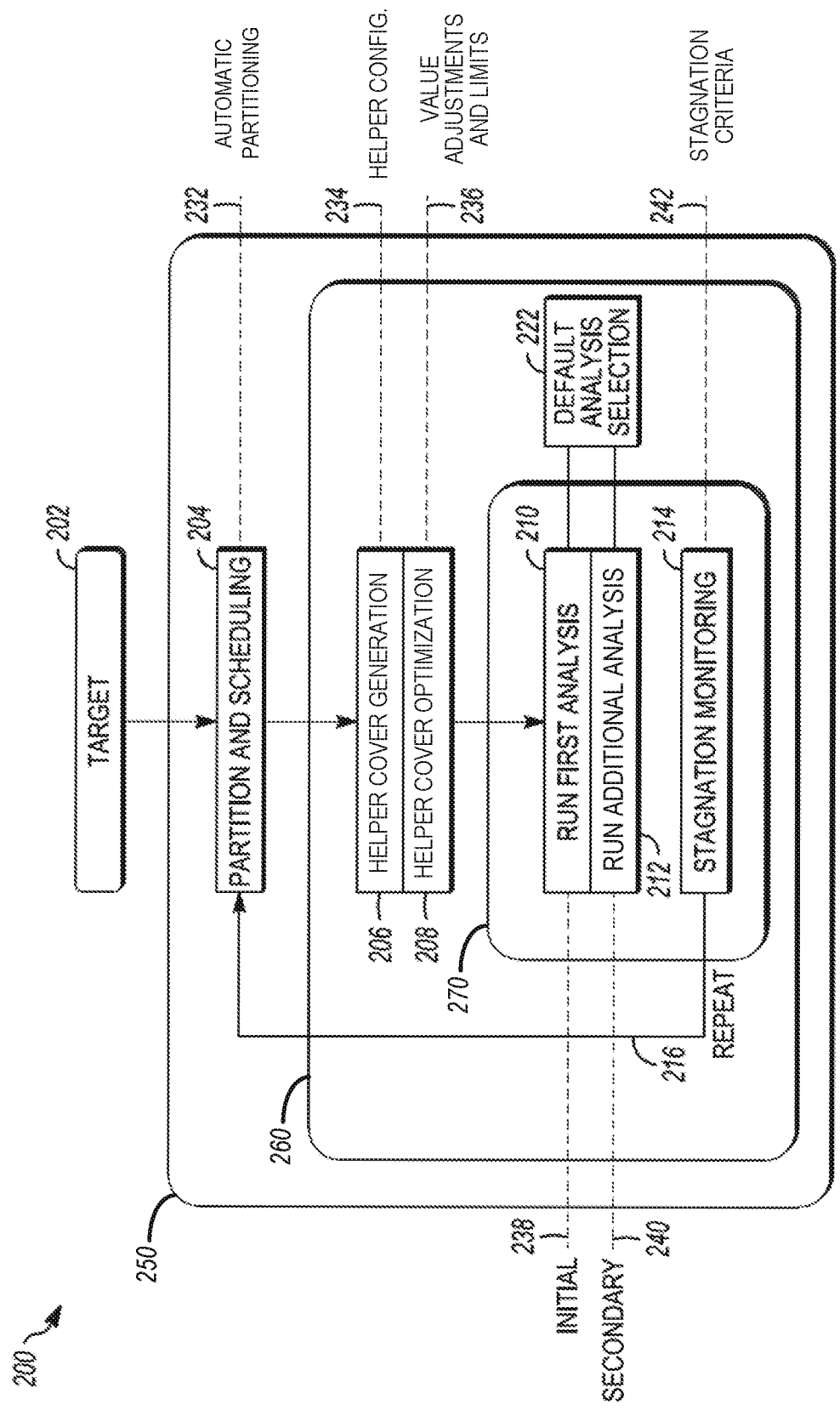
FIG. 2 illustrates aspects of automatic deep-state formal analysis, in accordance with some embodiments described herein.

FIG. 2 illustrates aspects of automatic deep-state formal analysis, in accordance with some embodiments described herein. FIG. 2 illustrates an automatic flow 200 for configuring and performing formal verification analysis operations. As described above, formal analysis involves verification that a circuit design has certain properties. This can involve a set of assertions and verification that the assertions are true or false. Such properties or assertions associated with expected circuit design function can also be referred to herein as "targets." The automatic flow 200 includes a main processing flow 250, and individual partition processing flow 260 which deals repetitively with individual partitions within the main processing flow 250, and analysis execution 270, which includes formal analysis operations, which can be run serially or in parallel, for each individual partition within individual partition processing flow 260. As shown in FIG. 2, automatic flow 200 begins with provided target(s) 202. These targets include the primary or main properties that the formal analysis is verifying. Each target can be associated with assertion properties (e.g., data or values associated with the assertion for a target) as well as default helper covers for the target (e.g., intermediate values expected to assist with proving or disproving the assertion for a target). The targets 202 can be considered the properties being used to search for bugs in the circuit design during the formal verification process (e.g., verifying that the bugs in the design exist, do not exist, or cannot be verified with certainty). After targets 202 are accessed or otherwise identified, automatic flow 200 proceeds with operations to configure assistance values for the formal analysis before automatic flow performs the actual formal analysis operations in an attempt to determine whether the properties or assertions expected of the circuit design (e.g., the targets) are met by the actual circuit design.

The pre-analysis configuration involves configuration operations of partitioning and scheduling 204, helper cover generation 206, and helper cover optimization 208. Given the complexities of the circuit design as a whole, the analysis is organized by segmenting the circuit design into partitions to organize and simplify particular aspects of the formal analysis. In partitioning and scheduling 204, the circuit design can be analyzed to break (e.g. segment) the verification of the circuit design into component pieces. In automatic flow 200, a system user of EDA tools (e.g., a designer generating, modifying, and/or verifying the circuit design under consideration) can select particular partitions, but in the absence of such particular selections, automatic partitioning 232 configuration selects one or more partitions of the circuit design and selects a schedule for analysis of the partitions in partition and scheduling 204. In various embodiments, the circuit design can be partitioned in different ways to identify segments of a circuit design that can be analyzed as part of the formal verification. Such segments can be analyzed with associated targets to simplify the analysis to circuit elements expected to impact a target, rather than analyzing the entire design for each target. In some systems, a structural analysis is performed on the circuit design by circuitry of a device performing automatic flow 200. The structural analysis identifies different structures within the circuit design that, for at least some targets, can be verified separately. In some embodiments, structures of a circuit design can be included in multiple segments depending on the targets to be verified, such that a particular structure that is part of a circuit design can be involved in verification analysis repeatedly for different targets. Identified structures can include, but are not limited to, memory structures, data path structures, power distribution structures, clock and timing structures, processing circuitry structures, or any combination of structures for an electronic circuit design. The targets 202 can be associated and scheduled for particular segments when the verification for a target only involves certain portions of a circuit design.

In addition to segments generated by structural analysis, segments can also be generated based on operating assumptions for the circuit design, with different segments for particular operating assumptions. Further still, some segments can be based both on structural segmentation and operating assumptions together, so that a first segment can be associated with a particular structure within the circuit design as well as a set of operating assumptions. In some embodiments, combinations of such segments as well as segments based on separate use of structures and operating assumptions and other segmenting criteria can be used. Thus, in one embodiment, automatic partitioning 232 configuration data can be provided to configure structural analysis, operating assumptions, and additional criteria to generate partition and scheduling 204 for a circuit design.

Figure 3:
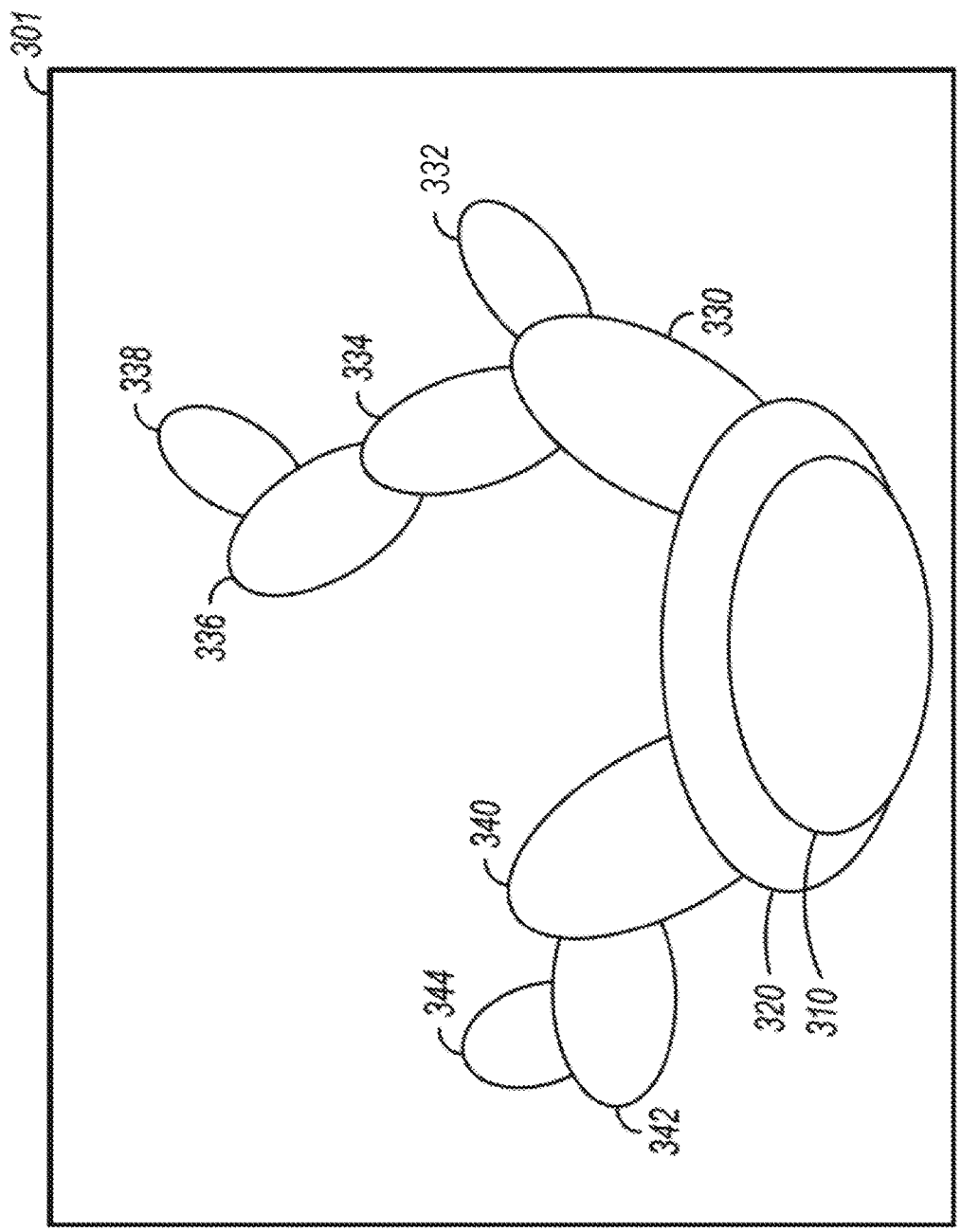
FIG. 3 illustrates aspects of automatic deep-state formal analysis in accordance with some embodiments described herein.
Figure 4A:
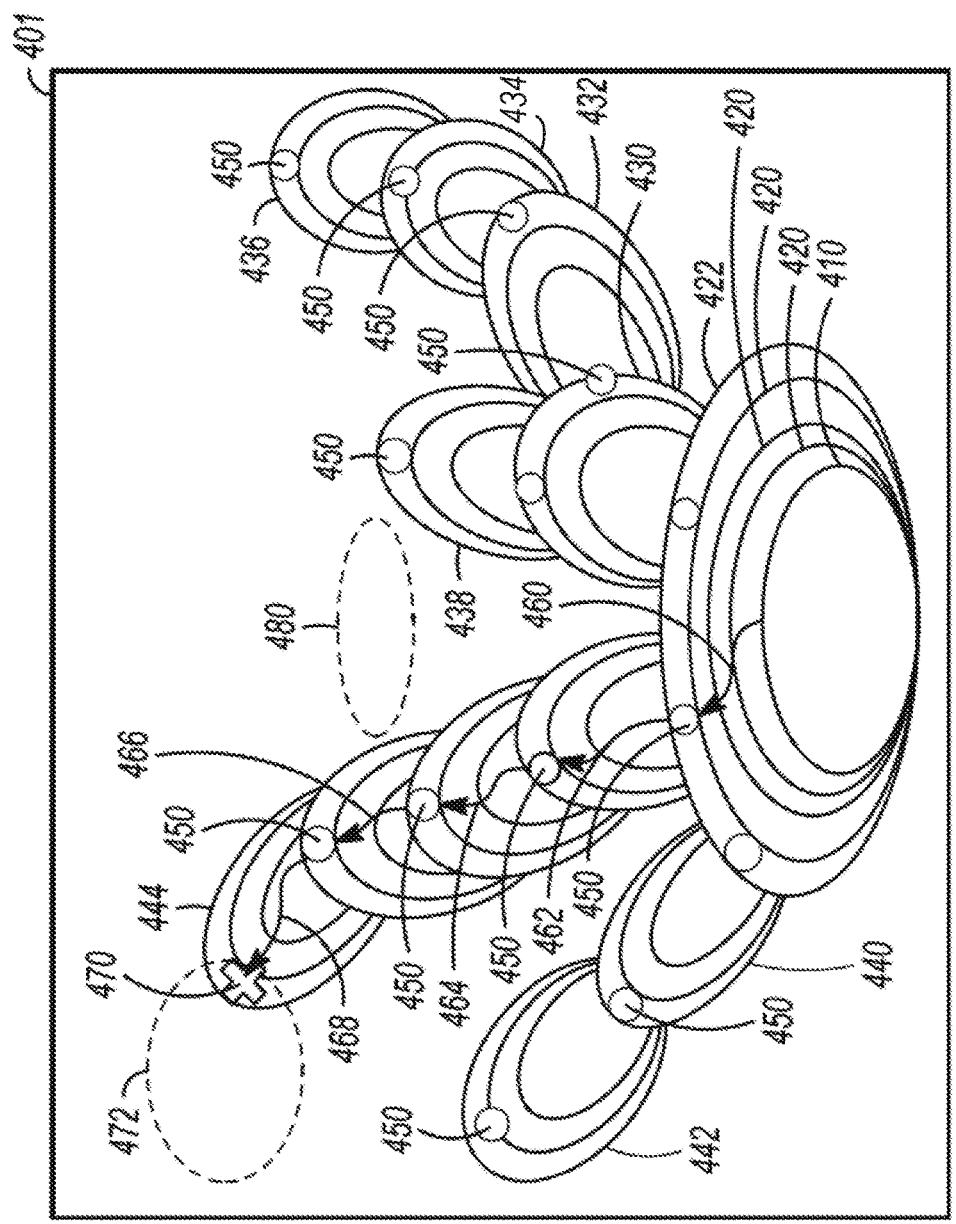
FIG. 4A illustrates aspects of automatic deep-state formal analysis, in accordance with some embodiments described herein.
Figure 4B:
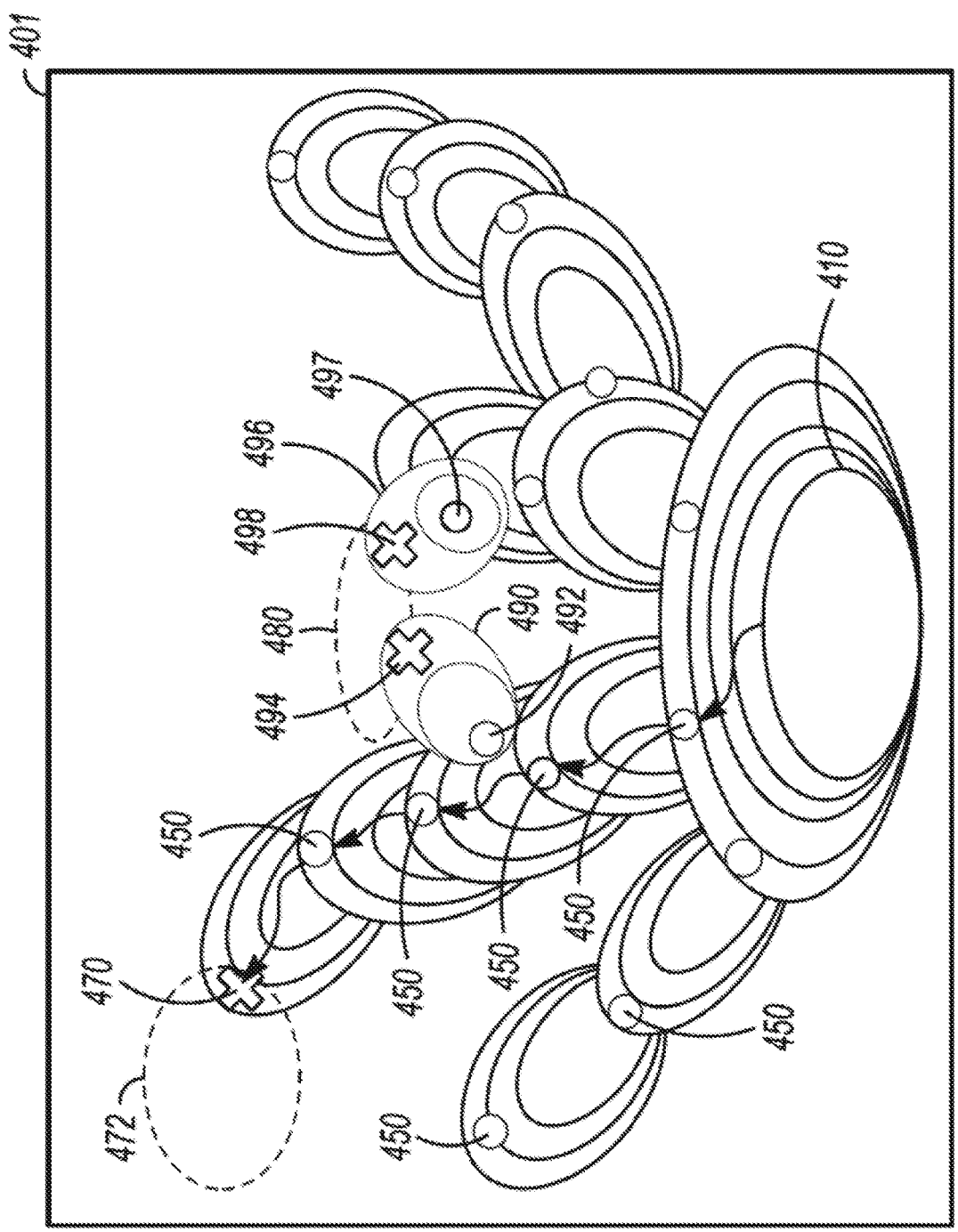
FIG. 4B illustrates aspects of automatic deep-state formal analysis, in accordance with some embodiments described herein.

After partition and scheduling 204, helper covers are configured in helper cover generation 206 operations and helper cover optimization operation 208. As described herein, a circuit design is associated with an operating space of all possible states that the circuit can achieve when operating in accordance with the expected design. While classic formal analysis can include a complete survey of the operating space for a circuit design, resource constraints limit such verification in modern complex designs. Formal analysis as referred to herein thus includes a partial analysis of the operating space of a design. Thus, formal analysis as described herein identifies certain operating states (e.g., targets, target properties, etc.) within the space for a circuit design and attempts to verify whether the target is met. The result can be that the target is met (e.g., the associated assertion is confirmed), the target is not met (e.g., the associated assertion is disproved, identifying an error in the design), or the target is uncertain (e.g., the analysis is unable to prove or disprove the assertion, due to resource constraints or the assertion being unprovable). In addition to analysis of particular targets, the formal analysis described herein can automatically perform verification operations within the operating space of a circuit design in an exploratory fashion, essentially "hunting" for bugs in a circuit design by searching though operating states of the circuit design and performing verification of the states during the search. FIGS. 3 and 4A-B describe particular aspects of such searches, which can be used for formal analysis as described herein.

To be effective, an analysis of a partial operating space (e.g., using targets 202) of a circuit design can use a set of properties to help guide the formal analysis. Such properties can be referred to herein as "helper covers" or intermediate partition and schedule values. Such helper covers can also be verification target data (e.g. intermediate verification targets in a set of verification targets) used to guide an analysis to a difficult to reach space in a state-space analysis of a system. To generate such partition and schedule values (e.g., verification targets or helper cover values used during a specifically scheduled formal analysis for a specific partition and target), an analysis of the design and the target properties for the design are analyzed and matched to partition and schedule values known to enable efficient formal verification operations for such combinations of designs and properties. These partition and schedule values (e.g., helper covers) are then used by the formal verification analysis for efficient verification of the operating space of the circuit design being verified in particular operations of the formal verification analysis. Helper cover configuration 234 data can be used in an analysis of a circuit design partition and a target to provide information about helper covers (e.g., partition and schedule values, configuration data, or intermediate targets with associated data) expected to assist in proving or disproving the assertion for a target based on the circuit design segment. Such helper cover configuration 234 data can be based on historical information of analysis for similar circuit design segments (e.g., circuit design blocks) that have been verified in other designs or based on system configurations associated with identification of types of circuit design segments. Such automatic covers generated based on an analysis of the circuit design and verification environment can be generated and provided to the later analysis. They can operate independently of user provided covers or default covers in a target or can be used as a compliment to such covers. Helper covers can be considered to create "interesting paths" to identify bugs. Automated helper covers can be based on historical or support (EDA design tool) information informed by EDA practice to identify bugs in circuit designs, and helper cover generation 206 can use this information to automatically generate helper covers for use by formal analysis operations (e.g., first analysis 210 and additional analysis 212).

In helper cover optimization 208 operations, the selected helper covers for a scheduled segment can be analyzed and adjusted based on an expected impact on the formal analysis. Value adjustments and limits 236 configuration data can be input to provide information in this optimization and can allow automatic flow 200 to adjust any helper covers or to suggest adjustments to a user. This can involve associating stagnation criteria (e.g., time-limits) on intermediate helper cover searching or tracing for a particular target. This can also involve identifying expected issues with helper covers. In some embodiments, expected errors, resource intensive covers with a low probability of identifying errors, or other such details can be automatically adjusted or flagged to a user with suggestions for altering or removing the identified helper covers. After helper covers are generated, traces can be obtained for the generated helper covers using formal analysis. Such traces can be assigned a priority based on an expected improvement provided by the helper cover traces. As the formal analysis process proceeds in searching for a final verification target, these helper cover traces can be consumed in order of priority as the formal analysis proceed.

In some embodiments, helper covers from helper cover generation 206 are generated by analyzing the design and analyzing various constructs within the design. For some systems, this analysis may not consider whether the generated covers are actually going to be useful. There is a certain set of properties (e.g., helper covers) that would actually hinder the progress if used during the formal analysis. The helper cover optimization 208 performs an up-front analysis on the generated set of helper covers to eliminate any of the properties that could potentially hinder the process of formal analysis to identify bugs or verify correct operation of the circuit design. For example, in a circuit design with a memory segment identified during partition and scheduling 204, this segment can have a scheduled helper cover to identify a full memory status. If the actual configuration of the memory design prevents the memory from every being full, this helper cover (e.g., intermediate target) is "unreachable." In other words, a formal analysis can perform all possible verification operations without achieving the full memory state. In some such situations, a formal analysis cannot conclude that the assertion of the helper cover is proven and also cannot conclude that this operating state is unreachable and so would just go on searching forever. Rather than allowing such a helper cover to proceed and be caught by a user or stagnation monitoring 214, helper cover optimization 208 can identify helper covers and segments that are expected to result in such an unreachable operating state and automatically remove the helper cover or flag the issue to a user for approval of the helper cover removal. In addition to removing such unreachable helper covers, similar covers identified as expected to involve inefficient use of resources can also be removed. Further, in addition to removing helper covers, values for helper covers (e.g., specific data defining a helper cover) can be modified or flagged for modification based on an expected improvement (e.g., an increase in a probability of successful tracing of the helper cover, improving the timing or output success for the associated target, decreasing a runtime to any such result, or any other improvement in device operation). Configuration data for such helper cover optimization 208 can be provided by input value adjustments and limits 236 data. This can include both data for automatic adjustments and values set by a user to adjust the automation. This can also allow automated adjustments or to request flags for user approval via a user interface during the configuration operations.

After the configuration, different types of formal analysis can be performed, shown as first analysis 210 and additional analysis 212. While two blocks are shown for first analysis 210 and additional analysis 212, analysis execution flow 270 can include any number of formal analysis runs (e.g. a first run through an Nth run). In some embodiments, these formal analysis runs (e.g. analysis 210 and 212) can be run in parallel to reduce an overall time for flow 200. In some embodiments, certain analysis runs can be performed serially, and some in parallel. Different embodiments can use any combination of serial and parallel operations for runs within an analysis execution flow 270 depending on the particular implementation. These analysis 210 and 212 procedures check the target(s) 202 established at the beginning of the automatic flow 200 as configured for analysis during the partition and scheduling 204, helper cover generation 206, and helper cover optimization 208. Default analysis selection 222 can be used to configure and select the initial analysis operations, with specific configurations for the selected analysis received as inputs via initial 238 configuration data and secondary 240 configuration data. Two analysis types are shown as included in automatic flow 200, but any number of analysis types can be used in different embodiments.

In embodiments using different formal verification analysis types, the information from one analysis type can be used to inform the operations of another analysis type. For example, a first analysis type can identify paths into deep-states of circuit design operation, and at certain points within these deep state paths, a more detailed analysis can be performed using a second analysis type around points in the operating space identified by the first analysis type.

During the analysis 210 and 212, stagnation monitoring 214 checks various criteria to limit the resources used on verification of specific targets 202 during analysis 210 and 212 (e.g. any number of analysis operations, which can be performed serially or in parallel). With helper covers and target properties, as the first analysis 210 and additional analysis 212 are running (either consecutively or simultaneously), the system uses helper covers to reach targets, essentially following paths through the design operating space using the helper covers. If at some point, one of the analysis procedures goes down a path and cannot find any new traces, (e.g., new helper covers), the process could sit there and churn using processing resources with no results. Instead, the system can optionally use stagnation criteria 242. Stagnation criteria 242 can, for example, be a time period that, when exceeded, is used by the stagnation monitoring 214 to conclude that an analysis has exhausted what can be achieved with a particular setup (e.g., a set of partition and scheduling values). Stagnation monitoring 214 will then initiate repeat 216 operations to go back to the beginning. This can involve moving on to a new partition or repeating the process for a segment with new partition and scheduling values based on the information identified in previous analysis operations. The next run regroups with new regenerated helper covers, which allows new configurations to explore additional operating space for the circuit design. When all analysis operations are complete for a target and the associated schedule segment, the process repeats for any additional scheduled segment. This results in automating formal analysis to run through multiple partitions of the target properties with automated stagnation monitoring. FIG. 2 describes a particular automatic flow 200, but various other similar process flows with different structures for selection of partitions, scheduling, covers, and formal analysis can also be used.

FIG. 3 illustrates aspects of automatic deep-state formal analysis, in accordance with some embodiments described herein. In particular, FIG. 3 illustrates one embodiment of a formal verification analysis 300 that can be performed by a device, in accordance with some embodiments. As described above, classical formal analysis involves proofs, which can take significant resources or in some cases be unprovable. Embodiments described herein simplify classical formal analysis by only providing partial coverage of the space 301 of all possible proofs for a circuit design. Thus, while classic formal analysis could provide coverage proofs for all possible functions in coverage space 301 for a circuit design, the formal verification analysis 300 only provides verification in the areas illustrated, rather than the full space 301. For example, initial operations 310 and 320 of formal verification analysis can verify operations in the illustrates sub-spaces, but can reach a point where further analysis of the entire space expanding upon the operation 320 to provide additional coverage is either excessively resource intensive or encounters verification operations in those spaces that are unprovable. Rather than simply leaving analysis of the aspects of the circuit design outside of the area for operations 310 and 320 unanalyzed, formal verification analysis 300 proceeds with smaller targeted deep-state analysis that goes beyond the points already reached in operations 310 and 320. This results in "chains" or "branches" of analysis into deep operating states of a circuit design. As described above, each chain is an exploration of operating space of a circuit design hunting for bugs and verifying correct operation of the circuit design when bugs are not found. As illustrated, formal verification analysis 300 involves operations 340, 342, and 344 as one chain of analysis into operation space of the circuit design away from the areas analyzed by operations 310 and 320. Similarly, operation 330 leads to two branches of verification operations, shown as operation 332 in one branch, and operations 334, 336, and 338 in a second branch. While the space 301 is represented in FIG. 3 as a two dimensional space, this is simply representing a mathematical space of operating conditions for a circuit design which can include large numbers of variable given the thousands or millions of elements within a possible circuit design that can be analyzed using formal verification operations. The illustrated coverage areas for identified analysis operations describe the concepts of verification operations reaching deep-state operating conditions of a circuit design using resource efficient operations for partial verification coverage of all possible circuit design operations in a way that would not be possible with a full verification of the entire space. While this reduces the confidence to determine conclusively that a circuit design is error free, such a formal verification analysis 300 enables efficient analysis of portions of the operating space 301 of the circuit design to identify bugs that would otherwise be missed due to resource constraints or limitations of full formal analysis or that would take significantly more resources to identify using full formal analysis.

FIGS. 4A and 4B illustrate aspects of automatic deep-state formal analysis 400, in accordance with some embodiments described herein. Formal analysis 400 is analyzing a segment of a circuit design with operating space 401. During an automatic flow for formal analysis of operating space 401, targets 472 and 480 for the circuit design are identified. Helper covers for intermediate targets 450 are identified. As described above, these helper covers can be generated automatically by an analysis of the circuit design or can be set through a combination of default inclusion with a target, user input selections, and automatic helper cover generation and optimization as described above in the description of FIG. 2. Following configuration, the illustrated first formal analysis 400 begins with operation 410 and branches out to additional areas of the circuit design operating space in operations 420 until a first set of helper covers (e.g., traces or intermediate targets) are identified in operation 422. Identification of the initial helper covers allows the formal analysis 400 to branch out into deep-states with sets of operations from the identified helper covers. This process is repeated in a search for targets 472 and 480.

As illustrated, a set of operations 440 identifies another helper cover, and a set of helper covers 442 similarly extends to another helper cover, but the operations then determine that this is a dead-end (either due to timing or other operating conditions flagging an end to this branch). Similarly, operations 430, 432, 434, 436, and 438 each terminate without reaching a target. One set of operations on trace paths 460-468 follow a set of helper covers 450 via sets of operations resulting in the set of operations 444 that analyzes target 472 at operating state 470, where a bug is identified as part of target 472. Formal analysis 400, however, remains indeterminate with respect to target 480.

FIG. 4B illustrates aspects of a second automatic deep-state formal analysis 490, in accordance with some embodiments described herein. In various embodiments, formal analysis 490 can be a second formal analysis type, which can operate in conjunction with formal analysis 400 using the resulting information from formal analysis 400, or can be a repeat of a segment with reconfigured or regenerated helper covers. The formal analysis 490 includes two additional helper covers 492 and 497. The corresponding analysis operations branching out from previously analyzed operating spaces 401 of the circuit design (e.g. set of operations 490 from helper cover 492 and set of operations 496 from helper cover 497, respectively) each result in identification of errors 494 and 498 in target 480. Such operations can repeat indefinitely, using repetitions with new helper covers, additional formal analysis types, or both, until the operating space of all targets for all segments has either been verified or associated with terminating stagnation criteria for the overall analysis.

The formal verification analysis 300 and 400 of FIGS. 3 and 4 can be referred to as a first type of analysis, or a "swarm" analysis that branches out from a core with operations to analyze operational spaces in a swarm pattern. Additional formal verification analysis types are also possible within various embodiments. For example, a trace analysis which follows a narrower path to an intermediate operating space can be used, with less analysis in the intermediate states prior to a target than is shown in the analysis type of FIGS. 3 and 4. Similarly, a disconnected or spot analysis can analyze disconnected areas of a circuit design operating space in a random or predefined pattern, such that operations do not connect or guide the analysis to the next operation as shown in FIGS. 3 and 4. In still further embodiments, other analysis types can be used for partial analysis or combinations of segmented full analysis and partial analysis of the operating space for a circuit design. As described above, any such formal analysis can be used within an automatic flow to search through the operating space of a circuit design as part of formal verification and analysis described herein.

Figure 5:
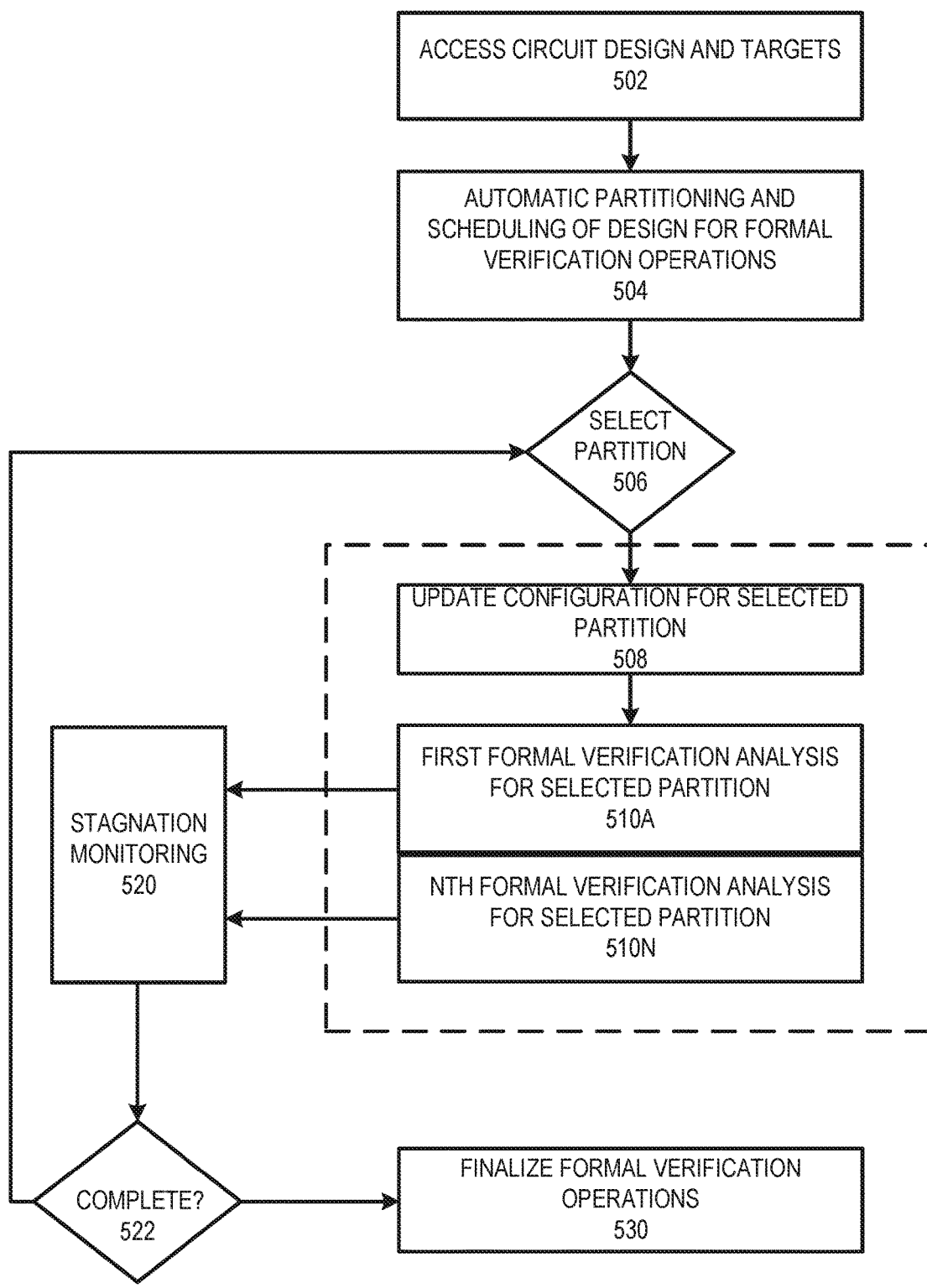
FIG. 5 illustrates aspects of automatic deep-state formal analysis, in accordance with some embodiments described herein.

FIG. 5 illustrates aspects of automatic deep-state formal analysis. in accordance with some embodiments described herein. The automatic flow 500 describes an additional embodiment, similar to automatic flow 200, which configures and implements formal analysis, such as formal analysis 300 or 400. In automatic flow 500, a circuit design and targets for the circuit design are accessed in operation 502. The circuit design is partitioned into segments, and associated targets are scheduled in operation 504. A looped formal analysis procedure is then initiated by selecting a first scheduled partition in decision 506. In operation 508, the configuration for formal analysis is updated. This includes automatic selection or modification of helper covers. If the selected partition has been analyzed previously, and is being repeated due to stagnation monitoring, the previous data can be used in updating this configuration, including selection of new helper covers for improved deep-state analysis based on relationships between the analyzed operating space, the traces through the operating space from previous helper covers, and the relationship of the previous traces with the targets. In some embodiments, flags for user inputs or configuration updates can be set during such a loop. Then, various formal verification analysis engines are used for the selected partition in operations 510A-N. As described above, different types of formal analysis can be used on a partition, and some of these can be run simultaneously to search the operating space of the circuit design for the identified targets (e.g., to prove or disprove the associated assertions). Stagnation monitoring 520 can be used to identify when either all targets are completed, the existing verification analyses engines have reached a point where new settings are requested, or where the automated flow 500 is configured to end the entire procedure without completion of all targets. If additional analysis with new settings (e.g., a new segment or an old segment with new partition and scheduling values) is triggered as part of decision 522 following by stagnation monitoring 520, the system returns to decision 506. If decision 522 identifies that the automated flow is ending (e.g., either due to verification of all targets or stagnation criteria determining that an additional repetition of indeterminate targets is not valuable), the system proceeds to finalize formal verification operations in operation 530. Finalizing formal verification operations can include an output identifying all bugs identified (e.g., assertions not meeting operating conditions) as well as targets that the automated flow was unable to verify. Such an output can include information on helper covers for all targets, including analyzed targets and unreached targets. For unreached targets, information about the operations used in various attempts to reach the target can be described.

Figure 6:
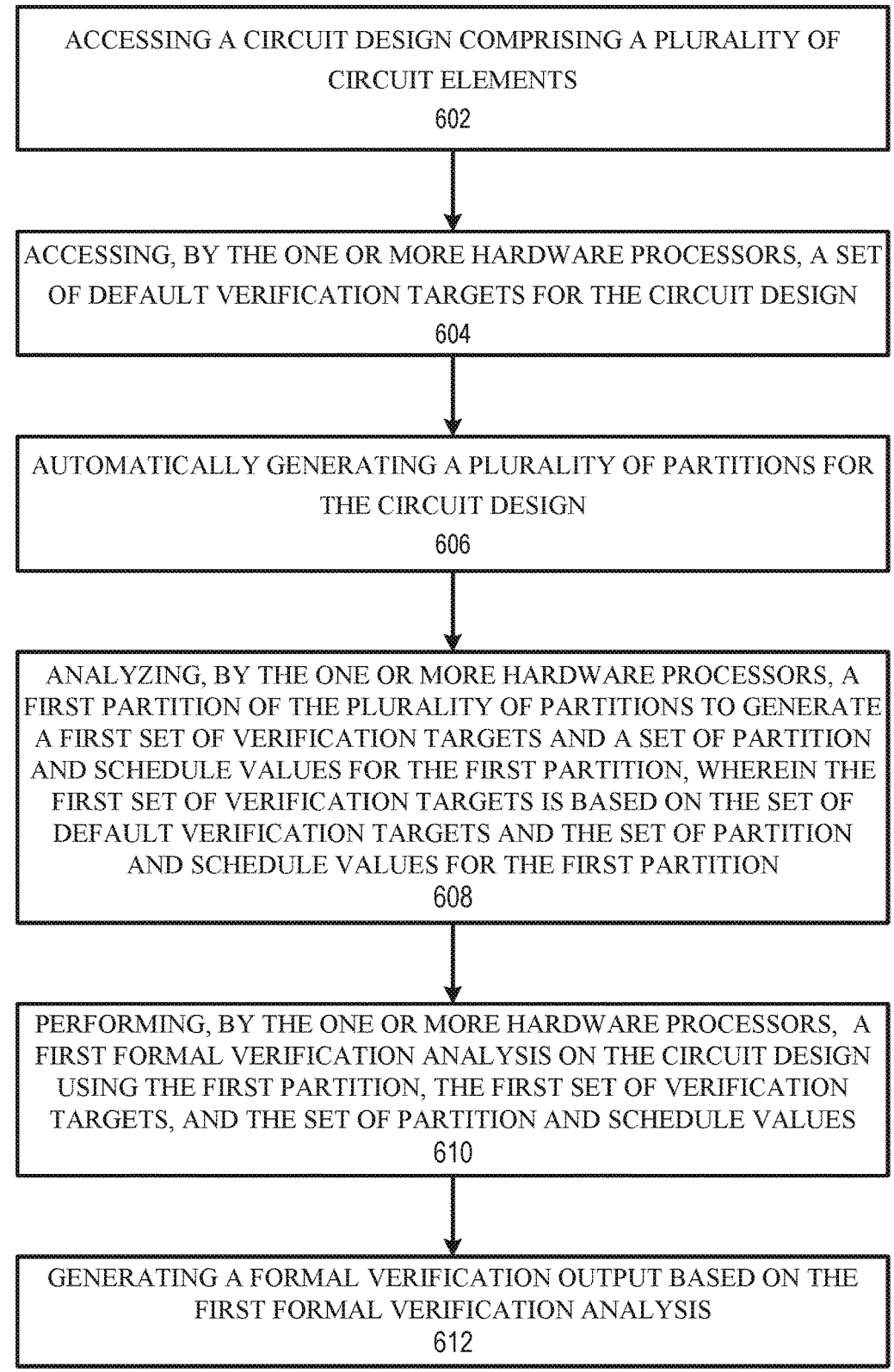
FIG. 6 describes an example method for aspects of automatic deep-state formal analysis, in accordance with some embodiments described herein.

FIG. 6 describes an example method 600 for aspects of automatic deep-state formal analysis in accordance with some embodiments described herein. The method 600 particularly describes one method for deep-state formal analysis of a circuit design in accordance with embodiments described herein. In some embodiments, the method 600 is performed by a computing device with one or more processors. In some embodiments, the method 600 is embodied in computer-readable instructions stored in a non-transitory storage device, such that when the instructions are executed by one or more processors of a device, the device performs the method 600. Other embodiments may be implemented using any acceptable format or instantiation.

Method 600 begins with operation 602 accessing, by one or more hardware processors, a circuit design comprising a plurality of circuit elements. The circuit design can be any electronic circuit design with any structures or data formats describing the design, including various details of such data described herein. The circuit elements can be configured in various structures, such as memory structures, data path structures, power distribution structures, clock and timing structures, processing circuitry structures, or any combination of structures for an electronic circuit design. A set of default verification targets for the circuit design are also accessed in operation 604. The default verification targets and the circuit design can be stored in a single memory coupled to processing circuitry of a device (e.g., an EDA computing device) performing method 600, or various parts of such data can be stored separately. In additional embodiments, system users performing the formal verification on the circuit design can provide customized target information or can manually modify the default targets. In other embodiments, the default targets are a starting point that can be automatically and/or manually adjusted at a later point.

A plurality plurality of partitions for the circuit design is then automatically generated in operation 606. As described above, such segments or partitions can be automatically generated through structural analysis of the circuit design, operating conditions of the circuit design, or any other such information relevant to formal analysis of the operating space of the circuit design. Automated helper covers can then be generated in operation 608 by analyzing a first partition of the plurality of partitions to generate a first set of verification targets (e.g., helper covers) and a set of partition and schedule values (e.g., values for the helper covers or any such configuration settings for the formal analysis) for the first partition. In some embodiments, the first set of verification targets is based on the set of default verification targets and the set of partition and schedule values for the first partition.

After automatic configuration of the settings for formal analysis, operation 610 proceeds with performing first formal verification analysis on the circuit design using the first partition, the first set of verification targets, and the set of partition and schedule values. In some embodiments, user manual settings can be used with the automatic settings described above. Additionally, multiple different formal verification analysis types can be performed with a single round of configuration. Similarly, the configuration and analysis elements can be repeated, either for the same partition segment with new configuration settings (e.g., new helper covers or other analysis settings) or for a new partition segment of the circuit design. A formal verification output based on the first formal verification analysis and any other analysis is generated in operation 612.

In some embodiments, the first set of verification targets can include at least one end target and one or more intermediate helper cover targets. Some embodiments operate by removing a first verification target of the set of default verification targets to generate the first set of verification targets in response to the analyzing the first partition to generate the first set of verification targets determining that a first verification target of the set of default verification targets is likely to degrade performance of the first formal verification analysis. Some embodiments operate by adding a first plurality of verification targets to the set of default verification targets to generate the first set of verification targets in response to the analyzing the first partition to generate the first set of verification targets determining that the first plurality of verification targets is likely to improve the formal verification output, based on the details of the first partition and the set of partition and schedule values.

Each target of the first set of verification targets can include, in some embodiments, an assertion associated with the first partition of the circuit design, and where the first formal verification output can include a true, a false, or an undetermined result for the assertion of said each target of the first set of verification targets. In other embodiments, the verification targets can have various values and settings. Some such embodiment further operate by performing a second formal verification analysis different from the first formal verification analysis on the circuit design using the first partition and the set of partition and schedule values, where the second formal verification analysis is automatically selected from a plurality of formal verification analysis types to improve a verification coverage of the formal verification output.

In some embodiments, automatically generating the plurality of partitions for the circuit design can include performing a structural analysis on the circuit design and generating the plurality of partitions based on the structural analysis of the circuit design. In some such embodiments, automatically generating the plurality of partitions for the circuit design can include identifying a plurality of operating assumptions for the circuit design, and generating the plurality of partitions based on the plurality of operating assumptions, where the set of partition and schedule values can include corresponding structure and operating assumption values for each partition of the plurality of partitions.

Additional operations of assessing the performing of the first formal verification analysis on the circuit design using the first partition with a set of stagnation criteria and terminating the performing of the first formal verification analysis with an undetermined result and a set of runtime properties for the formal verification output based on the set of runtime properties exceeding the set of stagnation criteria can be included in some embodiments. Some such embodiments further operate by automatically generating a second set of verification targets for the first partition based on the terminating the performing of the first formal verification analysis and the set of runtime properties and resuming the first formal verification analysis with the second set of verification targets. Some such embodiments operate with selection of a second partition of the plurality of partitions, where the second partition is different from the first partition, analyzing the second partition of the plurality of partitions to generate a second set of verification targets for the second partition, where the second set of verification targets is based on the set of default verification targets and a second set of partition and schedule values for the second partition, and performing, by the one or more hardware processors, a second formal verification analysis on the circuit design using the first partition, the second set of verification targets, and the second set of partition and schedule values.

The formal verification output can, in some embodiments, include a first formal verification result associated with an error in the circuit design. The output can include intermediate details, such as the trace path with helper covers used to reach a target and identify the errors. If no errors are found, the output can provide this information. Similarly, for unreached targets, relevant analysis and trace information in the deep-state paths used in attempts to reach the target can be identified along with the result that the target was not reached. Information about the time associated with such path analysis, and the stagnation criteria used to determine that the analysis flow would terminate without reaching the target, can be included.

Some embodiments can use the information about identified errors with segment information, structural analysis information, or any other such information about a circuit design for automatically modifying the circuit design to correct the error in the circuit design associated with the first formal verification result from the formal verification output. The updated circuit design can be used, in some embodiments, with operations for automatically initiating fabrication of a circuit using the updated circuit design with a correction of the errors (e.g., design bugs or design elements not meeting targets or formal specifications) identified during formal analysis. The updated circuit design can then be used to fabricate (e.g., generate) or initiate generation of an integrated circuit using the component arrangement. In various embodiments, various devices, systems, and methods are used to fabricate devices based on the updated circuit design. In some embodiments, this includes generation of masks, and the use of machinery for circuit fabrication. In various implementations, files generated by embodiments described herein are used to create photolithographic masks for lithography operations used to generate circuits according to a circuit design, where a pattern defined by the masks is used in applying a thin uniform layer of viscous liquid (photo-resist) on the wafer surface. The photo-resist is hardened by baking and then selectively removed by projection of light through a reticle containing mask information. In some implementations, the files are further used for etching patterning, where unwanted material from the surface of the wafer is removed according to details described in the design files, where a pattern of the photo-resist is transferred to the wafer by means of etching agents. In some embodiments, aspects of design files generated according to the operations described herein are used for deposition operations, where films of the various materials are applied on the wafer. This may involve physical vapor deposition (PVD), chemical vapor deposition (CVD), or any such similar processes. Some embodiments may use files generated according to operations described herein for: chemical mechanical polishing, where a chemical slurry with etchant agents is used to planarize to the wafer surface; oxidation where dry oxidation or wet oxidation molecules convert silicon layers on top of the wafer to silicon dioxide; ion implantation where dopant impurities are introduced into a semiconductor using a patterned electrical field; or diffusion where bombardment-induced lattice defects are annealed. Thus, in various embodiments, systems and operations include not only computing devices for generating updated circuit design files, but also hardware systems for fabricating masks, controlling integrated circuit (IC) fabrication hardware, and the hardware and operations for fabricating a circuit from a circuit design (e.g., component arrangement) generated in accordance with various embodiments described herein.

While particular embodiments are described above, including ordered steps and placement of elements in various orders, it will be apparent that other embodiments may include repeated operations, or any number of intervening operations between the operations described.

Figure 7:
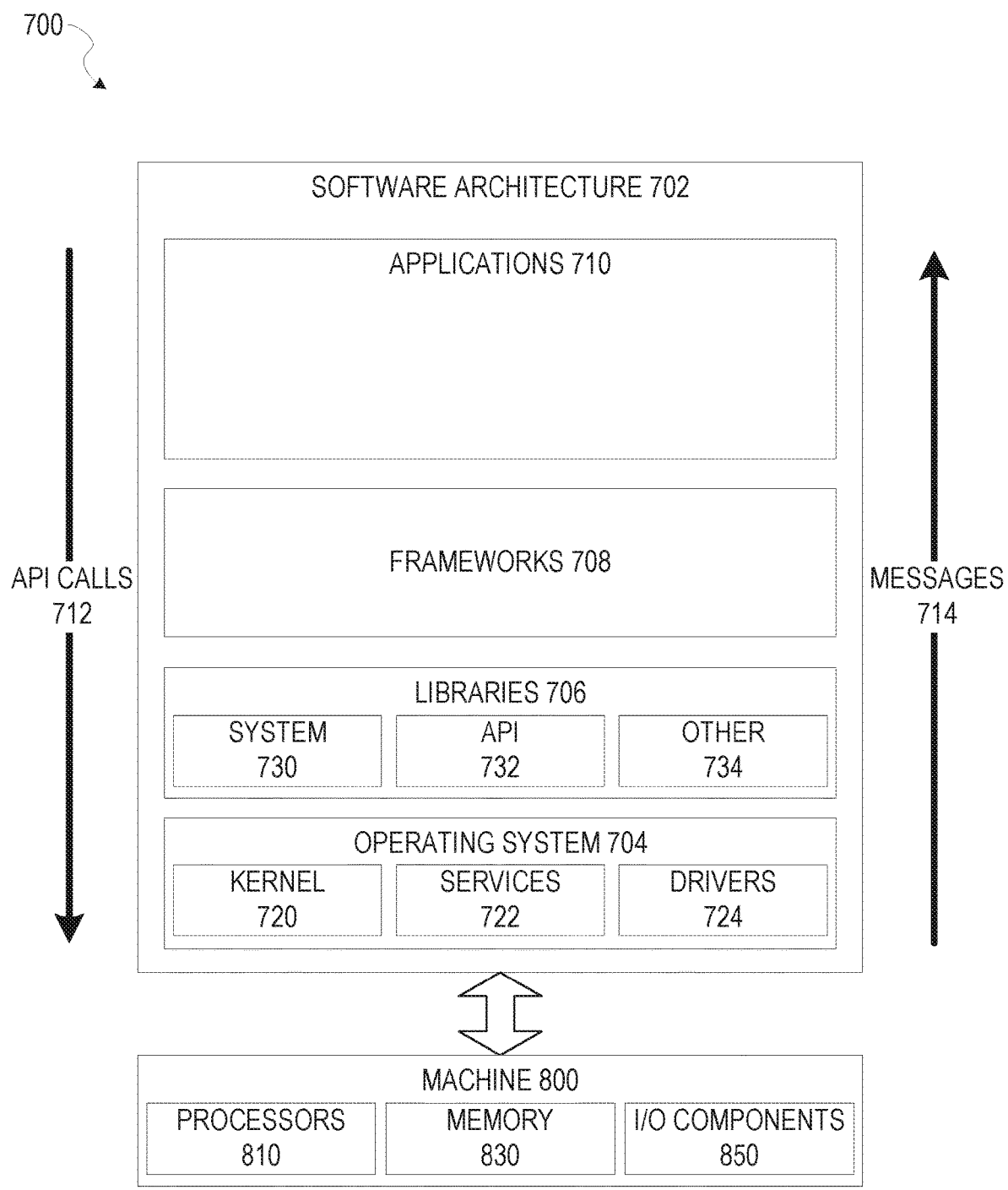
FIG. 7 is a block diagram illustrating an example of a software architecture that may be operating on an EDA computer and used with EDA methods of deep-state formal circuit analysis and verification during design and creation of circuits and circuit designs, in accordance with some embodiments.

FIG. 7 is a block diagram 700 illustrating an example of a software architecture 702 that may be operating on an EDA computer and used with methods for formal verification and formal analysis of a circuit design as part of creation of a design and a physical device, in accordance with embodiments described herein. The software architecture 702 can be used as an EDA computing device to implement any of the methods described above. Aspects of the software architecture 702 may, in various embodiments, be used to store circuit designs and data needed for formal analysis (e.g., configuration data for helper covers, stagnation criteria, etc.), as well as execute operations for design checks, other verification, synthesis, placement and routing, physical sign-off, or any other such operations in an EDA environment to generate circuit designs, with physical devices generated using these circuit designs.

FIG. 7 is merely a non-limiting example of a software architecture 702, and it will be appreciated that many other architectures can be implemented to facilitate the functionality described herein. In various embodiments, the software architecture 702 is implemented by hardware such as a machine 800 that includes multi-core processors 810, memory 830, and input/output (I/O) components 850. In this example, the software architecture 702 can be conceptualized as a stack of layers where each layer may provide a particular functionality. For example, the software architecture 702 includes layers such as an operating system 704, libraries 706, software frameworks 708, and applications 710. Operationally, the applications 710 invoke application programming interface (API) calls 712 through the software stack and receive messages 714 in response to the API calls 712, consistent with some embodiments. In various embodiments, any client device, server computer of a server system, or other device described herein may operate using elements of the software architecture 702. An EDA computing device described herein may additionally be implemented using aspects of the software architecture 702, with the software architecture 702 adapted for operating to perform EDA operations with deep-state formal analysis, in accordance with embodiments described herein.

In one embodiment, an EDA application of the applications 710 performs operations for formal analysis, according to embodiments described herein, using various modules within the software architecture 702. For example, in one embodiment, an EDA computing device similar to the machine 800 includes the memory 830, and one or more multi-core processors 810 are used to implement a process flow similar to process flow 100.

In some embodiments, an output module may be used to update a display of the I/O components 850 of the EDA computing device with data associated with the updated circuit design to correct errors identified during formal verification and analysis as part of operations of the process flow implemented as modules of applications 710. In various other embodiments, rather than being implemented as modules of one or more applications 710, some or all of the EDA modules implementing embodiments described herein may be using elements of the libraries 706 or the operating system 704.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, signal-processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 706 provide a low-level common infrastructure utilized by the applications 710. The libraries 706 can include system libraries 730 such as libraries of multi-instance blocks for use in an EDA environment or other libraries that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and 3D in a graphic context on a display), database libraries (e.g., SQLite to provide various relational database functions), web libraries, and the like. The libraries 706 may also include other libraries 734.

The software frameworks 708 provide a high-level common infrastructure that can be utilized by the applications 710, according to some embodiments. For example, the software frameworks 708 provide various graphic user interface (GUI) functions, high-level resource management, high-level location services, and so forth. The software frameworks 708 can provide a broad spectrum of other APIs that can be utilized by the applications 710, some of which may be specific to a particular operating system 704 or platform. In various embodiments, the systems, methods, devices, and instructions described herein may use various files, macros, libraries, and other elements of an EDA design environment to implement analysis described herein. This includes analysis of input design files for an integrated circuit design, along with any element of hierarchical analysis that may be used as part of or along with the embodiments described herein. While netlist files, library files, SDC files, and viewDefinition files are examples that may operate within a software architecture 702, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application-specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 800 including multi-core processors 810), with these operations being accessible via a network (e.g., the Internet) and via one or more appropriate interfaces (e.g., an API). In certain embodiments, for example, a client device may relay or operate in communication with cloud computing systems, and may store media content such as images or videos generated by devices described herein in a cloud environment.

The performance of certain of the operations may be distributed among the processors, not only residing within a single machine 800, but deployed across a number of machines 800. In some example embodiments, the multi-core processors 810 or processor-implemented modules are located in a single geographic location (e.g., within a home environment, an office environment, or a server farm). In other example embodiments, the multi-core processors 810 or processor-implemented modules are distributed across a number of geographic locations.

Figure 8:
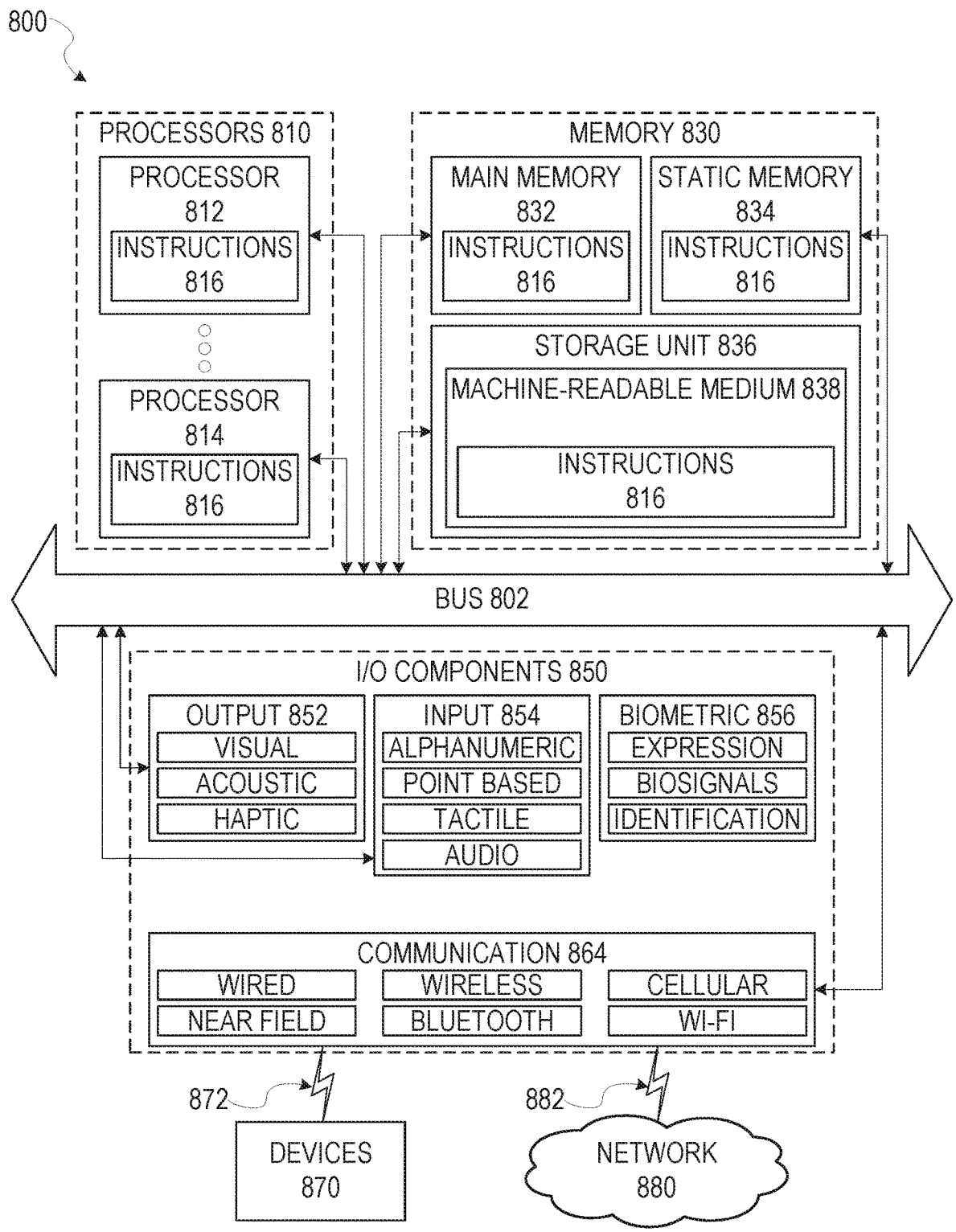
FIG. 8 is a diagrammatic representation of a machine in the form of a computer system within which a set of instructions are executed, causing the machine to perform any one or more of the methodologies discussed herein, according to some example embodiments.

FIG. 8 is a diagrammatic representation of the machine 800 in the form of a computer system within which a set of instructions may be executed for causing the machine 800 to perform any one or more of the methodologies discussed herein, according to an example embodiment. FIG. 8 shows components of the machine 800, which is, according to some embodiments, able to read instructions from a machine-readable medium (e.g., a machine-readable storage medium) and perform any one or more of the methodologies discussed herein. In some embodiments, the machine 800 may operate with instructions 816 (e.g., software, a program, an application, an applet, an app, or other executable code) for causing the machine 800 to perform any one or more of the methodologies discussed. In alternative embodiments, the machine 800 operates as a standalone device or can be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 can comprise, but not be limited to, a server computer, a client computer, a personal computer (PC), a tablet computer, a laptop computer, a netbook, a set-top box (STB), a personal digital assistant (PDA), a media system, a cellular telephone, a smart phone, a mobile device, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

In various embodiments, the machine 800 comprises multi-core processors 810, memory 830, and I/O components 850, which can be configured to communicate with each other via a bus 802. In an example embodiment, the multi-core processors 810 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) include, for example, an independent processor 812 and an independent processor 814 that may execute the instructions 816. The term "processor" is intended to include multi-core processors 810 that may comprise two or more independent processors 812, 814 (also referred to as "cores") that can execute the instructions 816 contemporaneously. Although FIG. 8 shows multiple multi-core processors 810, the machine 800 may include a single independent processor 812 with a single core, a single processor 812 with multiple cores (e.g., a multi-core processor 812), multiple processors 810 with a single core, multiple processors 810 with multiples cores, or any combination thereof.

The memory 830 comprises a main memory 832, a static memory 834, and a storage unit 836 accessible to the multi-core processors 810 via the bus 802, according to some embodiments. The storage unit 836 can include a machine-readable medium 838 on which are stored the instructions 816 embodying any one or more of the methodologies or functions described herein. The instructions 816 can also reside, completely or at least partially, within the main memory 832, within the static memory 834, within at least one of the multi-core processors 810 (e.g., within the processor's cache memory), or any suitable combination thereof, during execution thereof by the machine 800. Accordingly, in various embodiments, the main memory 832, the static memory 834, and the multi-core processors 810 are considered machine-readable media 838.

As used herein, the term "memory" refers to a machine-readable medium 838 able to store data temporarily or permanently and may be taken to include, but not be limited to, random-access memory (RAM), read-only memory (ROM), buffer memory, flash memory, and cache memory. While the machine-readable medium 838 is shown, in an example embodiment, to be a single medium, the term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., the instructions 816) for execution by a machine (e.g., the machine 800), such that the instructions, when executed by one or more processors of the machine (e.g., the multi-core processors 810), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 850 include a wide variety of components to receive input, provide output, produce output, transmit information, exchange information, capture measurements, and so on. In general, it will be appreciated that the I/O components 850 can include many other components that are not shown in FIG. 8. The I/O components 850 are grouped according to functionality merely for simplifying the following discussion, and the grouping is in no way limiting. In various example embodiments, the I/O components 850 include output components 852, input components 854, and biometric components 856. The output components 852 include visual components (e.g., a display such as a plasma display panel (PDP), a light-emitting diode (LED)

display, a liquid crystal display (LCD), a projector, or a cathode ray tube (CRT)), acoustic components (e.g., speakers), haptic components (e.g., a vibratory motor), other signal generators, and so forth. The input components 854 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design phase 110, or outputs for circuit fabrication. In various embodiments, outputs of a timing analysis are used to generate updates and changes to a circuit design, and after a final closure of timing with all associated timing thresholds and design requirements met, circuit design output files are used to generate masks and other physical outputs for generation of a circuit. As described herein, "requirements," "design elements," and other aspects of a circuit design refer to selectable values that are set as part of the design of a circuit. Such design requirements or elements may be adjusted by a system operator or circuit designer to suit the particular goals of a project or circuit that results from the operations described herein.

Communication can be implemented using a wide variety of technologies. The I/O components 850 may include communication components 864 operable to couple the machine 800 to a network 880 or devices 870 via a coupling 882 and a coupling 872, respectively. For example, the communication components 864 include a network interface component or another suitable device to interface with the network 880. In further examples, the communication components 864 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 870 may be another machine or any of a wide variety of peripheral devices (e.g., a peripheral device coupled via a USB).

Transmission Medium

In various example embodiments, one or more portions of the network 880 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-speed Packet Access (HSPA), Worldwide Interoperability for Microwave Access (WiMAX), Long-Term Evolution (LTE) standard, others defined by various standard-setting organizations, other long-range protocols, or other data transfer technology.

Furthermore, the machine-readable medium 838 is non-transitory (in other words, not having any transitory signals) in that it does not embody a propagating signal. However, labeling the machine-readable medium 838 "non-transitory" should not be construed to mean that the machine-readable medium 838 is incapable of movement; the machine-readable medium 838 should be considered as being transportable from one physical location to another. Additionally, since the machine-readable medium 838 is tangible, the machine-readable medium 838 may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and the operations may be performed in an order that differs from the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, techniques, instruction sequences, and computing machine program products that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A method comprising:
   accessing, by one or more hardware processors, a circuit design comprising a plurality of circuit elements;
   accessing, by the one or more hardware processors, a set of default verification targets for the circuit design;
   automatically generating, by the one or more hardware processors, a plurality of partitions for the circuit design;
   analyzing, by the one or more hardware processors, a first partition of the plurality of partitions to generate a first set of verification targets for the first partition and to generate a set of partition and schedule values known to enable formal verification for the first partition, wherein the first set of verification targets is based on the set of default verification targets, and wherein the first set of verification targets is matched to the set of partition and schedule values;
   performing, by the one or more hardware processors, a first formal verification analysis on the circuit design using the first partition, the first set of verification targets, and the set of partition and schedule values; and
   generating, by the one or more hardware processors, a formal verification output based on the first formal verification analysis.

2. The method of claim 1, wherein the first set of verification targets comprises at least one end target and one or more intermediate helper cover targets.

3. The method of claim 1, further comprising removing a first verification target of the set of default verification targets to generate the first set of verification targets in response to the analyzing the first partition to generate the first set of verification targets determining that the first verification target of the set of default verification targets is likely to degrade performance of the first formal verification analysis.

4. The method of claim 1, further comprising adding a first plurality of verification targets to the set of default verification targets to generate the first set of verification targets in response to the analyzing the first partition to generate the first set of verification targets determining that the first plurality of verification targets is likely to improve the formal verification output, based on details of the first partition and the set of partition and schedule values.

5. The method of claim 1, wherein each target of the first set of verification targets comprises an assertion associated with the first partition of the circuit design; and
   wherein the first formal verification output comprises a true, a false, or an undetermined result for the assertion of said each target of the first set of verification targets.

6. The method of claim 5, further comprising performing, by the one or more hardware processors, a second formal verification analysis different from the first formal verification analysis on the circuit design using the first partition and the set of partition and schedule values, wherein the second formal verification analysis is automatically selected from a plurality of formal verification analysis types to improve a verification coverage of the formal verification output.

7. The method of claim 1, wherein the automatically generating, by the one or more hardware processors, the plurality of partitions for the circuit design comprises performing a structural analysis on the circuit design and generating the plurality of partitions based on the structural analysis of the circuit design.

8. The method of claim 7, wherein the automatically generating, by the one or more hardware processors, the plurality of partitions for the circuit design comprises identifying a plurality of operating assumptions for the circuit design, and generating the plurality of partitions based on the plurality of operating assumptions, wherein the set of partition and schedule values comprises corresponding structure and operating assumption values for each partition of the plurality of partitions.

9. The method of claim 1, further comprising assessing the performing of the first formal verification analysis on the circuit design using the first partition with a set of stagnation criteria; and
   terminating the performing of the first formal verification analysis with an undetermined result and a set of runtime properties for the formal verification output based on the set of runtime properties exceeding the set of stagnation criteria.

10. The method of claim 9, further comprising automatically generating a second set of verification targets for the first partition based on the terminating the performing of the first formal verification analysis and the set of runtime properties; and
    resuming the first formal verification analysis with the second set of verification targets.

11. The method of claim 9, further comprising selecting a second partition of the plurality of partitions, wherein the second partition is different from the first partition;
    analyzing, by the one or more hardware processors, the second partition of the plurality of partitions to generate a second set of verification targets for the second partition, wherein the second set of verification targets is based on the set of default verification targets and a second set of partition and schedule values for the second partition; and
    performing, by the one or more hardware processors, a second formal verification analysis on the circuit design using the first partition, the second set of verification targets, and the second set of partition and schedule values.

12. The method of claim 1, wherein the formal verification output comprises a first formal verification result associated with an error in the circuit design.

13. The method of claim 12, further comprising automatically modifying the circuit design to correct the error in the circuit design associated with the first formal verification result from the formal verification output.

14. The method of claim 1, further comprising initiating fabrication of a circuit using the circuit design.

15. A device for performing verification of a circuit design, the device comprising:
a memory storing data describing:
a circuit design, wherein the circuit design comprises a plurality of structural components and a plurality of operating criteria; and
a set of default verification targets for the circuit design; and
one or more hardware processors coupled to the memory and configured to perform operations comprising:
accessing the circuit design and the set of default verification targets;
automatically generating a plurality of partitions from the circuit design based on the plurality of structural components and the plurality of operating criteria, wherein each partition of the plurality of partitions is associated with a corresponding set of partition and schedule values based on the plurality of structural components and the plurality of operating criteria;
analyzing a first partition of the plurality of partitions to generate a first set of verification targets for the first partition and to generate a first set of partition and schedule values known to enable formal verification for the first partition, wherein the first set of verification targets is based on the set of default verification targets, and wherein the first set of verification targets is matched to the first set of partition and schedule values;
performing, by the one or more hardware processors, a first formal verification analysis on the circuit design using the first partition, the first set of verification targets, and the first set of partition and schedule values; and
generating a formal verification output based on the first formal verification analysis.

16. The device of claim 15, wherein the first formal verification analysis comprises a plurality of formal verification analysis types selected automatically based on the set of partition and schedule values for the first partition to provide partial verification coverage for a formal verification space associated with the circuit design.

17. The device of claim 15, wherein each target of the first set of verification targets comprises an assertion associated with the first partition of the circuit design; and
wherein the first formal verification output comprises a true, a false, or an undetermined result for the assertion of said each target of the first set of verification targets.

18. A non-transitory computer readable medium comprising instructions that, when executed by one or more hardware processors of a device, cause the device to perform operations of a method for analysis and verification of a circuit design, the method comprising:
accessing a circuit design and a set of default verification targets, wherein the circuit design comprises a plurality of structural components and a plurality of operating criteria;
automatically generating a plurality of partitions from the circuit design based on the plurality of structural components and the plurality of operating criteria, wherein each partition of the plurality of partitions is associated with a corresponding set of partition and schedule values based on the plurality of structural components and the plurality of operating criteria;
analyzing a first partition of the plurality of partitions to generate a first set of verification targets for the first partition and to generate a first set of partition and schedule values known to enable formal verification for the first partition, wherein the first set of verification targets is based on the set of default verification targets, and wherein the first set of verification targets is matched to the first set of partition and schedule values;
performing, by the one or more hardware processors, a first formal verification analysis on the circuit design using the first partition, the first set of verification targets, and the first set of partition and schedule values; and
generating a formal verification output based on the first formal verification analysis.

19. The non-transitory computer readable medium of claim 18, wherein the instructions further cause the device to perform operations comprising:
selecting a second partition of the plurality of partitions, wherein the second partition is different from the first partition;
analyzing the second partition of the plurality of partitions to generate a second set of verification targets for the second partition, wherein the second set of verification targets is based on the set of default verification targets and a second set of partition and schedule values for the second partition; and
performing a second formal verification analysis on the circuit design using the first partition, the second set of verification targets, and the second set of partition and schedule values;
wherein the formal verification output is further based on the second formal verification analysis.

20. The non-transitory computer readable medium of claim 18, wherein the instructions further cause the device to perform operations comprising:
assessing the performing of the first formal verification analysis on the circuit design using the first partition with a set of stagnation criteria; and
terminating the performing of the first formal verification analysis with an undetermined result and a set of runtime properties for the formal verification output based on the set of runtime properties exceeding the set of stagnation criteria.

* * * * *